(12) United States Patent
Vermeulen

(10) Patent No.: US 9,956,814 B2
(45) Date of Patent: May 1, 2018

(54) METHOD OF DECORATING A SUBSTRATE

(71) Applicant: SPANOLUX N.V.-DIV. BALTERIO, Sint-Baafs-Vijve (BE)

(72) Inventor: Bruno Paul Louis Vermeulen, Aldeneik-Maaseik (BE)

(73) Assignee: UNILIN BVBA, Wielsbeke (BE)

( * ) Notice: Subject to any disclaimer, the term of this patent is extended or adjusted under 35 U.S.C. 154(b) by 167 days.

(21) Appl. No.: 14/892,665

(22) PCT Filed: May 14, 2014

(86) PCT No.: PCT/EP2014/059877
§ 371 (c)(1),
(2) Date: Nov. 20, 2015

(87) PCT Pub. No.: WO2014/187714
PCT Pub. Date: Nov. 27, 2014

(65) Prior Publication Data
US 2016/0121646 A1 May 5, 2016

(30) Foreign Application Priority Data
May 23, 2013 (EP) .................................. 13168911

(51) Int. Cl.
*B44C 1/24* (2006.01)
*B41M 5/025* (2006.01)
(Continued)

(52) U.S. Cl.
CPC .............. *B44C 1/24* (2013.01); *B41M 5/0256* (2013.01); *B44C 5/04* (2013.01); *B32B 38/14* (2013.01);
(Continued)

(58) Field of Classification Search
CPC .............. B41M 5/0256; B41M 7/0027; B41M 7/0045; B44C 1/24; B44C 5/04; B32B 38/14

See application file for complete search history.

(56) References Cited

U.S. PATENT DOCUMENTS 4,223,057 A    9/1980   Rejto
5,444,037 A *   8/1995   Imai ........................ B32B 38/10
                                                         428/500

(Continued)

FOREIGN PATENT DOCUMENTS

EP    1925461    5/2008
EP    2412516    2/2012

OTHER PUBLICATIONS

International Search Report and Written Opinion for corresponding foreign application PCT/EP2014/059877, filed May 14, 2014.

*Primary Examiner* — Sonya Mazumdar
(74) *Attorney, Agent, or Firm* — Steven M. Koehler; Westman, Champlin & Keohler, P.A.

(57) ABSTRACT

A method of decorating a substrate comprises the steps of supplying a substrate, supplying a carrier, providing the carrier with a textured surface, applying a sublimation agent on the carrier, placing the substrate and the carrier including the textured surface and the sublimation agent onto each other, pressing the substrate and the carrier together and subliming the sublimation agent towards the substrate, removing the carrier from the substrate, wherein the textured surface of the carrier is provided by applying a pattern of a hard substance on the carrier.

17 Claims, 4 Drawing Sheets

(51) Int. Cl.
*B44C 5/04* (2006.01)
*B32B 38/14* (2006.01)
*B41M 7/00* (2006.01)

(52) U.S. Cl.
CPC ......... *B41M 7/0027* (2013.01); *B41M 7/0045* (2013.01)

(56) References Cited

U.S. PATENT DOCUMENTS

| | | | |
|---|---|---|---|
| 6,228,805 B1* | 5/2001 | Ohshima | B41J 2/325 427/152 |
| 2003/0174197 A1* | 9/2003 | Odaka | B41M 5/38257 347/175 |
| 2004/0026017 A1 | 2/2004 | Taylor | |
| 2009/0074948 A1* | 3/2009 | Ihara | B41M 5/0256 427/8 |
| 2010/0009102 A1 | 1/2010 | Vermeulen | |

* cited by examiner

METHOD OF DECORATING A SUBSTRATE

CROSS-REFERENCE TO RELATED APPLICATION

The present application is a national stage filing of International patent application Ser. No. PCT/EP2014/059877, filed May 14 2014, and published as WO 2014/187714 A1 in English.

BACKGROUND

The discussion below is merely provided for general background information and is not intended to be used as an aid in determining the scope of the claimed subject matter.

The present invention pertains to a method of decorating a substrate comprising the steps of supplying a substrate and a carrier, applying a sublimation agent on the carrier, placing the substrate and the carrier including the sublimation agent onto each other, pressing the substrate and the carrier together and subliming the sublimation agent towards the substrate and removing the carrier from the substrate.

Such a method is known in the prior art. During the sublimation step the sublimation agent evaporates from the carrier or a transfer sheet and penetrates into the substrate. After the sublimation process the transfer sheet is removed from the substrate. Due to the sublimation process the sublimation agent does not stay on the surface of the substrate but is absorbed therein, hence minimizing sensitivity to wear of a decoration pattern of the sublimed agent.

SUMMARY

The Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the present invention is to provide a method for decorating a substrate in a flexible manner.

This is achieved by the method n, which comprises the steps of supplying a substrate, supplying a carrier, providing the carrier with a textured surface, applying a sublimation agent on the carrier, placing the substrate and the carrier including the textured surface and the sublimation agent onto each other, pressing the substrate and the carrier together and subliming the sublimation agent towards the substrate, and removing the carrier from the substrate, wherein the textured surface of the carrier is provided by applying a pattern of a hard substance on the carrier.

An advantage of the method is that the step of subliming is combined with a step of embossing the substrate. During the step of pressing the pattern of the hard substance will impress an upper surface of the substrate. It is noted that the hard substance may be a different material than the material of the rest of the carrier. Furthermore, the method provides the opportunity to adjust the pattern of the hard substance and a pattern of the sublimation agent to each other. For example, both patterns may coincide such that embossing-in-register is achieved. Therefore, the method creates a great flexibility in decorating a substrate. It is also possible to start with a uniform fresh carrier, for example having a flat front and back side, and vary the textured surface thereof easily.

Preferably, the pattern of the hard substance is applied by printing and curing a curable substance on the carrier, since this allows to change the desired pattern quickly.

The curable substance may be printed by means of a digital printer, which is able to create an accurate decoration pattern of the curable substance on the carrier. The decoration pattern of the curable substance may have a relationship with the pattern of the sublimation agent. For example, both patterns may be in register such that the resulting substrate can be embossed-in-register with the sublimated agent in the substrate, for example a wood nerve pattern. However, numerous alternative patterns are conceivable, possibly having varying colors.

The sublimation agent may be printed on the carrier, preferably by means of a digital printer. Using a digital printer provides a great flexibility in the pattern to be printed. This makes production of relatively small product batches with different decoration patterns efficient. Production series can be made unique and/or client-specific and obsolete stocks can be avoided. Alternative embodiments of contact printing or non-contact printing of the sublimation agent are conceivable, for example by means of roller coating. When the sublimation agent is printed onto the carrier it may have a velocity of 5-10 m/s, but a higher or lower velocity is conceivable.

Particularly, when both the hard substance, or more specifically the curable substance, and the sublimation agent are both applied by digitally controlled devices, a great freedom of possible design choices is created.

A sublimation process appears to result in attractive decoration patterns in the resulting panel, since any non-regular pattern in the sublimation agent on the carrier, for example due to a failure in the process of applying the sublimation agent, will be smoothened during the step of subliming. This is caused by the fact that the sublimation agent slightly diverges during travelling in the step of subliming. If the sublimation agent is applied by means of a controlled nozzle, a failing nozzle may create a disturbed pattern of the sublimation agent on the carrier, but the disturbance may be eliminated after subliming.

In a practical embodiment the substrate and the carrier are placed onto each other such that the textured surface faces the substrate. A back side of the carrier opposite to the textured surface may be flat such that a press plate that contacts the back side may be flat, as well. It is also possible that both the carrier and the press plate have a textured surface, whereas the respective embossed patterns are different or similar or even coincident. For example, a rough texture may be created by the textured press plate, whereas a fine texture, like a gloss variation, can be created by the textured carrier.

The sublimation agent may be applied at a side of the carrier which is directed to the substrate or which is directed away from the substrate. If the sublimation agent is applied on the side of the carrier directed away from the substrate, the sublimation agent must also travel through the carrier towards the substrate during the step of sublimation.

The step of providing the textured surface may be performed before the step of applying the sublimation agent. Alternatively, the step of providing the textured surface may be performed after the step of applying the sublimation agent or synchronously, for example on opposite sides of the carrier. It is noted that if the step of applying the hard substance is performed after the step of applying the sublimation agent at a side of the carrier which is directed to the substrate the sublimation agent has to travel through the pattern of hard substance during the step of sublimation.

It is efficient to perform the steps of pressing and subliming synchronously. In practice the carrier and the substrate may be placed between press plates which are heated in order to perform subliming. The heated press plates may also be useful if the embossing process should not only be performed by cold deformation of the substrate, but in combination with weakening or melting an upper portion of the substrate by heat, for example in case of a resinous material, in order to facilitate the embossing process.

Before the step of pressing, at least an additional layer may be applied between the substrate and the carrier, wherein the additional layer is fixed to the substrate during the step of pressing. Such an additional layer may have specific functionalities, for example wear-resistant, scratch-resistant, water-repellent, UV resistance, color stability properties or the like. The additional layer may be a protective layer including anti-wear particles. During the step of subliming, the sublimation agent can be transferred through the protective layer and penetrate into the substrate or remain substantially in the protective layer. The anti-wear particles may be corundum particles, glass beads, silica or the like. The size of the particles may be selected such that the influence thereof on the process of sublimation is minimized. Alternatively, the protective layer does not include particles, for example the protective layer comprises an ionomer such as abcite or Surlyn™. A combination of an ionomer and particles is also conceivable.

In a specific embodiment the additional layer comprises a resin-impregnated sheet, wherein during the step of pressing heat is supplied to the sheet so as to laminate the sheet to the substrate. In this embodiment the step of embossing and sublimation is combined with the step of laminating.

In an alternative embodiment a resin-containing layer is provided on at least one of the carrier and the substrate before the carrier and the substrate are placed onto each other such that the resin-containing layer is disposed between the carrier and the substrate, wherein the resin is heated above its melting temperature during the step of pressing. The resin-containing layer will be attached to the substrate and embossed, whereas the sublimation process is performed at the same time.

In a preferred embodiment the resin-containing layer is coated as a liquid on the carrier. This means that the layer is free of a sheet such as a resin-impregnated sheet. The resin-containing layer may be dried or partly dried before placing the carrier and the substrate onto each other. Possible resins are melamine, melamine blends, phenol, polyester, ionomers, polyurethane, acrylate, or the like. The resin-containing layer may also comprise wear-resistant particles.

It is noted in general that resin layers through which a sublimed agent should travel may be partly cured, since a fully cured resin layer may hinder travelling of the sublimed agent. During or after subliming, the curing process may be controlled and completed.

A release agent coating may be provided directly on the textured surface in order to facilitate loosening the carrier after the steps of pressing and subliming. The release agent coating may be activated during the step of pressing and/or heating. The thickness of the release agent coating may be smaller than the thickness of the carrier.

The carrier may comprise a flexible sheet, for example made from PET.

The pattern of the hard substance on the carrier may be applied by first printing a liquid or adhesive onto the carrier in a desired pattern, and then providing a hard substance, for example a powder, to the liquid, such that a part of the hard substance sticks to the liquid whereas abundant hard substance is removed, for example by an air stream. The liquid may be cured together with the hard substance, or partly or entirely evaporated, whereas the hard substance is fixed to the carrier. The hard substance may remain in the form of particles or may be melted together into a single mass which is elevated above the initial upper surface of the carrier. It is conceivable that the liquid and the hard substance together form a curable substance or the hard substance itself forms a curable substance adhering to the panel upon curing. Furthermore, the hard substance may contain a swelling material such that upon curing the volume of the substance becomes larger and the elevations higher than that of the sum of the liquid and the hard substance separately. Alternatively, a powder, toner or any comparable material is printed on the carrier and cured to a hard substance.

It is also possible that the pattern of the hard substance is created by applying a curable substance on the carrier, which is cured without auxiliary components, by means of heating, infrared radiation, UV-radiation, electron beam or the like. This means that the curable substance is substantially entirely liquid upon application and substantially free from hard particles, for example. Acrylate (for example a UV-curable acrylic coating) is such a substance, for example, but alternative substances are conceivable.

The sublimation agent may be a water-based, solvent-based or a material comprising a UV curable agent. The water-based agent is advantageous in terms of costs of the agent as well as required technology for applying it to the carrier. The solvent-based agent is beneficial for adhering to certain materials of the carrier, for example carriers and/or textured surfaces made of polymer, for example acrylate, PVC, or the like. The sublimation agent may be a sublimable coloring agent (ink or dye) comprising a resin binder and a dyestuff which is generally referred to as a disperse dye. The disperse dye can be an organic dyestuff such as disazo dyes, anthraquinone dyes and methine dyestuffs.

The carrier may be provided with a fixing material to fix the sublimation agent to the substrate temporarily, i.e. in the period between the step of applying the sublimation agent on the carrier and the step of subliming. In practice the sublimation agent and the carrier will be selected on the basis of their mutual compatibility. The carrier preferably comprises a print receptive surface, for example an inkjet receptive surface, which is suitable for receiving a sublimation agent, for example a water-based or solvent-based ink or a material comprising UV curable ink. The sublimation agent may have viscosity and drying properties such that flow of the sublimation agent on the carrier is limited and that it dries soon after being applied on the carrier.

The substrate may be rigid or flexible. For example, the substrate can be a foil which should still be fixed to a rigid layer by means of laminating, gluing or the like. The substrate may be a large board which has to be cut into separate pieces after the step of sublimation. The separate pieces may be provided with locking means such as tongues and grooves so as to be able to fix the pieces to each other, such as known from prior art floor panels. Alternatively, the substrates are already provided with locking means and are ready for use after the step of subliming. In such a case the supplied substrate may already be provided with locking means before applying the sublimation agent; the substrate may then be smaller than the large board as mentioned hereinbefore.

The substrate may be a floor panel, a wall panel, a ceiling panel, a panel for furniture, packaging, skirting or the like and be suitable for interior and/or exterior use. It may be made of wood-based material like MDF, HDF, WPC, or vinyl, metal, glass, stone, ceramic, polymeric composite, mineral wool such as glass wool or stone wool, or the like.

It is noted, that in general, when applying a substrate of mineral wool in a laminate panel or board, a balancing layer may be omitted since the substrate of mineral may be sufficient rigid, unlike panels of conventional materials such as those made of MDF, HDF or the like. This is not necessarily related to the method of decorating a substrate by means of sublimation.

The substrate may be provided with a receptive portion for receiving the sublimation agent upon the step of subliming. The receptive portion may be a separate layer, for example a foil or a film, a resin-impregnated paper, a non-woven sheet or web, a UV lacquer layer, a water-based, a solvent-based lacquer layer, or an integrated layer portion of the substrate. The receptive portion can have absorbance properties for absorbing the sublimation agent. Preferably, the properties are such that spread of the sublimation agent in lateral direction of the travelling path towards and/or into the receptive portion is minimized. The receptive portion may form a white background before the step of subliming. If the receptive portion is attached to a core which is substantially impermeable to the sublimation agent, the sublimation agent does not penetrate into the core during the step of subliming, but may remain in the receptive portion.

In a practical embodiment the substrate is supplied in the form of a stack of layers to be laminated synchronously with the steps of pressing and subliming. For example, the stack of layers may comprise a core which is disposed between a resin-impregnated top sheet and a resin-impregnated balancing sheet. After performing the method the substrate may be a laminate panel comprising a core which is fixed to the top sheet and the balancing sheet, whereas the top sheet is embossed and the sublimation agent is absorbed in the substrate.

The step of subliming can be performed by means of providing heat such that the sublimation agent evaporates. It is conceivable to concentrate the heat to the sublimation agent, for example by means of applying laser technology, but alternatively both the carrier and the substrate are heated. During the step of subliming, the carrier may be covered by means of a cover member so as to force the sublimation agent to travel away from the carrier towards the substrate. The cover member may be a sheet or a plate which can be heated. Besides, the cover member may exert a pressure onto the carrier and the substrate during the step of pressing. The cover member may comprise a heated press plate. This means that the step of subliming may be combined with a step of laminating by using a heated press plate, and also combined with embossing due to the presence of a textured surface on the carrier.

The method may be performed by way of a continuous or a non-continuous process.

In an alternative embodiment a curable coating is applied on the substrate before pressing the substrate and the carrier together, wherein the curable coating is embossed by the textured surface of the carrier during the step of pressing, whereas the coating is cured during the step of subliming due to the raised temperature during sublimation. This means that the temperature increase leads to an efficient process of synchronously subliming and curing of the coating. The curable coating may be applied by means of inert calendar coating, but alternative methods are conceivable.

BRIEF DESCRIPTION OF THE DRAWINGS

Aspects of the invention will hereafter be elucidated with reference to drawings illustrating embodiments of the invention very schematically.

DETAILED DESCRIPTION OF ILLUSTRATIVE EMBODIMENTS

Figure 1:
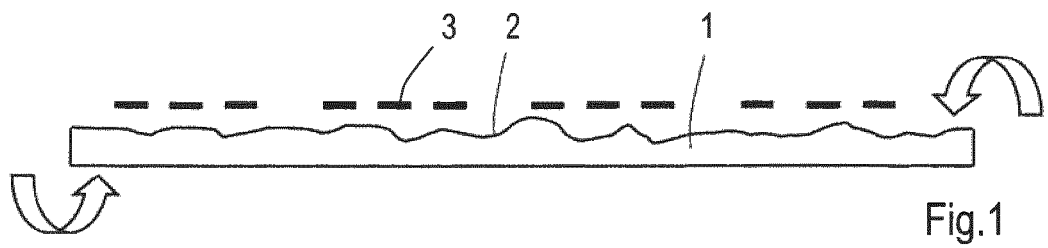
FIGS. 1-4 are illustrative views of consecutive steps of an embodiment of the method of decorating a panel.
Figure 2:
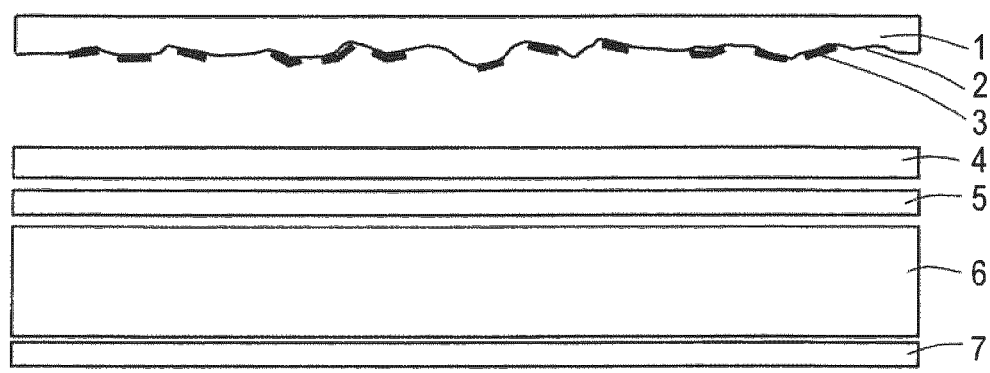

FIGS. 1-4 show some steps of an embodiment of a method disclosed herein. FIG. 1 shows a carrier 1 which is provided with a textured upper surface 2. The carrier 1 is a flexible sheet in this case. A sublimation agent 3 is printed onto the textured surface 2 of the carrier 1 by means of a digital printer (not shown). After the step of printing, the carrier 1 including the sublimation agent 3 is turned upside down and placed onto a stack of separate layers 4-7, as illustrated in FIG. 2. The separate layers comprise an overlay 4, a base coat 5, a core 6 and a balancing layer 7. The overlay 4, the base coat 5 and the balancing layer 7 comprise resin-impregnated sheets. It is noted that the balancing layer 7 may be omitted if the core 6 is sufficiently rigid. The material of the core 6 may be a wood-based material like MDF, HDF, WPC, or vinyl, metal, glass, stone, ceramic, polymeric composite or the like.

Figure 3:
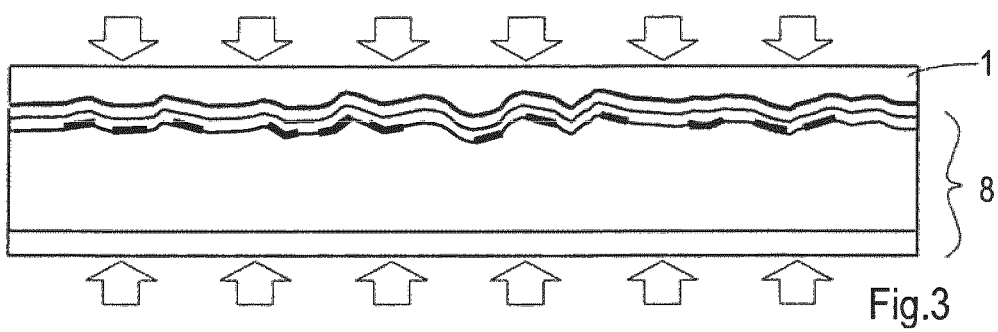

FIG. 3 shows a next condition in which the stack of layers 4-7 and the carrier 1 are pressed together under elevated heat such that the resin of the resin-impregnated sheets 4, 5, 7 melts and the sublimation agent 3 sublimates directly from a solid state to a vapor state. On the one hand, the layers 4-7 are laminated to each other and on the other hand, the vaporized sublimation agent 3 travels through the overlay 4 and the base coat 5, as illustrated in FIG. 3. As a consequence, a laminate panel 8 is formed. The surface of the sublimation agent 3 in the resulting panel 8 may be larger than the corresponding surface of the sublimation agent 3 on the carrier 1 before the step of sublimation, since the sublimation agent 3 slightly diverges during the step of subliming.

The overlay 4 may have wear-resistant properties. For that reason it may contain anti-wear particles as known in overlays of conventional laminates, such as corundum in laminate floor panels. The base coat 5 may be a resin-impregnated sheet having a background color, which is compatible with the core 6 and the overlay 4.

In general, the layers to be laminated should not only be compatible in terms of fixing to each other but may also be compatible to each other in relation to wear resistance and sublimation characteristics.

Figure 4:
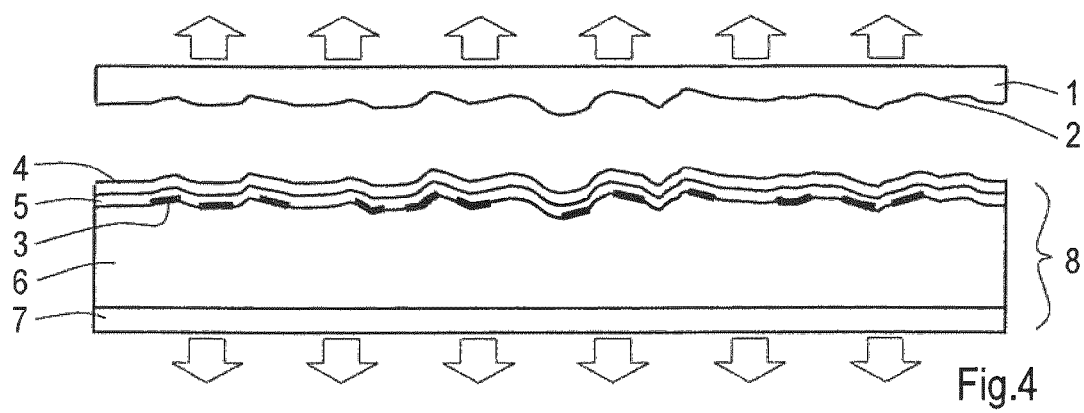

In a next step, the carrier 1 is removed from the resulting panel 8, as shown in FIG. 4. An upper surface of the resulting laminate panel 8 has an embossment which corresponds to the textured upper surface 2 of the carrier 1. FIG. 4 shows that the sublimation agent 3 remains in the base coat 5 in this case. This may be achieved by applying a core 6 which is impermeable to the sublimation agent 3. In the steps as shown in FIGS. 1-4 the stack of layers 4-7 can be considered as a substrate which is pressed together with the carrier 1 including the textured surface 2 and the sublimation agent 3. In an alternative embodiment the supplied substrate may be a panel, for example a finished laminate or any other panel or board, on which the carrier 1 is placed and pressed together.

Figure 5:
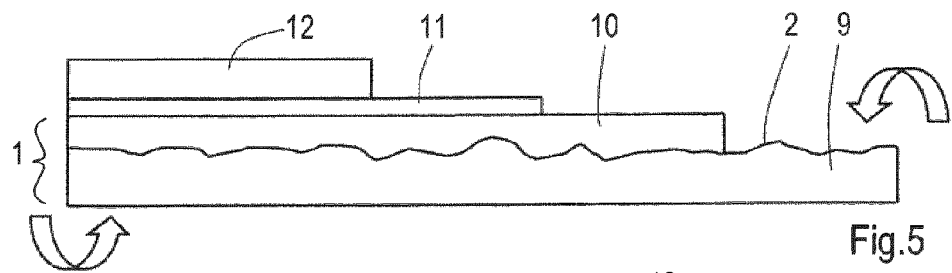
FIGS. 5-8 are similar views as FIGS. 1-4, showing an alternative embodiment.

FIGS. 5-8 show some consecutive steps of an alternative embodiment of the method. FIG. 5 shows that the carrier 1 comprises two layers: a base sheet 9, in this case made of PET (polyester or Polyethylene terephthalate), having a textured upper surface 2. The upper surface 2 is coated with a release agent coating 10, which is activated upon pressing at elevated temperature. PET appears to be a very good material for guiding sublimated agent. Alternatively, the base sheet 9 may be a paper, foil or film made of resin-impregnated material, polyester or the like.

Figure 6:
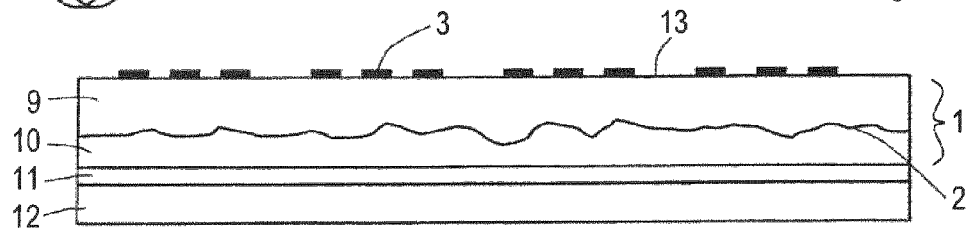

A first overlay 11 and a second overlay 12 are applied onto the carrier 1. The first overlay 11 comprises nano scratch-resistant particles and a resin, and the second overlay 12 comprises wear-resistant particles and a resin. FIGS. 5 and 6 show that the carrier 1 including the first and second overlays 11, 12 is turned upside down and placed onto a substrate which comprises the base coat 5, the core 6 and the balancing layer 7. The base coat 5 and the balancing layer 7 comprise resin-impregnated sheets and are already laminated to the core 6, but the first and second overlays 11, 12 are free of sheets. In the condition as shown in FIG. 6 the textured upper surface 2 faces the core 6. FIG. 6 further shows that the sublimation agent 3 is printed on a back side 13 of the carrier 1 which is opposite to the textured upper surface 2 of the base sheet 9 of the carrier 1.

Figure 7:
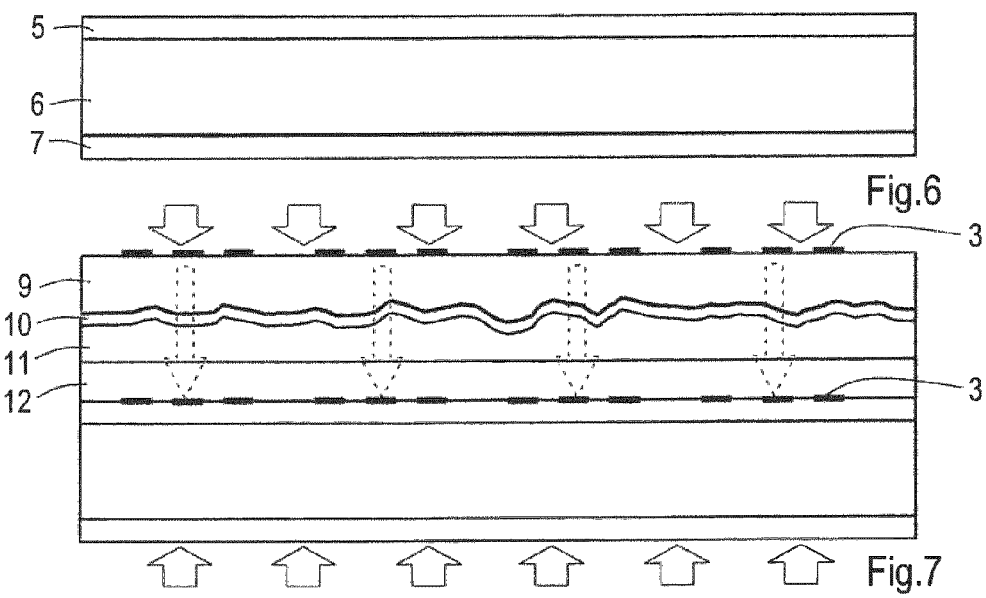
Figure 8:
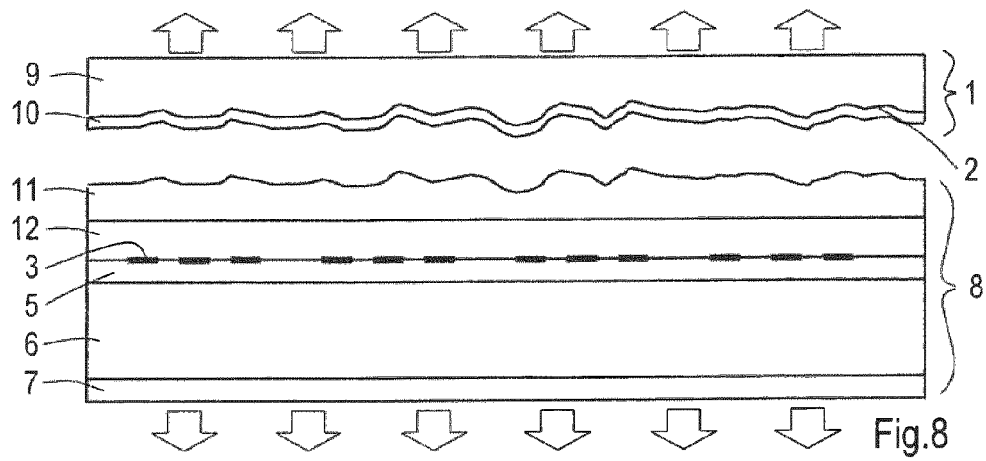

FIG. 7 illustrates a condition in which the stack of layers 5-7 and the carrier 1 including the first and second overlays 11, 12 are pressed together under elevated heat, such that the layers 5-7 are attached to the first and second overlays 11, 12. Moreover, the vaporized sublimation agent 3 travels through the base sheet 9, the release agent coating 10, the first and second overlays 11, 12 into the base coat 5, as illustrated in FIGS. 7 and 8, hence forming the panel 8. During the step of hot pressing the release agent coating 10 is activated such that the carrier 1 can be removed from the resulting panel 8 easily without sticking to the first overlay 11, which is shown in FIG. 8. In practice, remaining portions of the activated release agent coating 10 may be left on the base sheet 9 and/or on the resulting panel 8, but this can be removed easily from the panel 8 if present thereon. The resulting panel 8 has an embossed upper surface which is provided with nano scratch resistant particles.

The layers 10-12 on the carrier 1 may be applied in different manners, for example by means of roller coating, curtain coating, casting, spraying, printing. The wear resistant particles and/or nano scratch resistant particles may be scattered onto the coated resin or mixed with the resin before coating. The type of coating may be a resin, for example melamine, melamine blends, phenol, polyester, acrylic resin and the like, ionomers or anti-static, elastic or anti-bacterial matter, depending on the desired functionalities of the layers.

It is also conceivable to print the sublimation agent 3 onto the textured surface of the base sheet 9 or onto the release agent coating 10 before applying the first and second overlays 11, 12. In that case the sublimation agent 3 does not have to travel through the base sheet 9 during the sublimation step.

Figure 9:
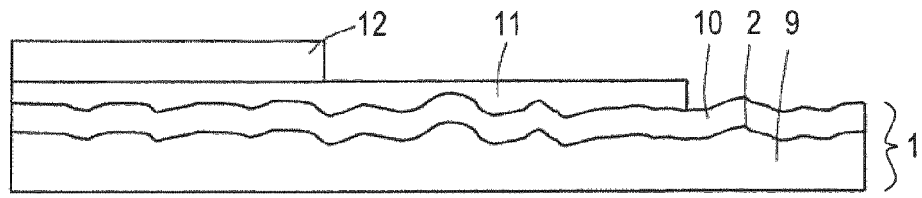
FIGS. 9-13 are similar views as FIGS. 1-4, showing another alternative embodiment.

FIGS. 9-13 show some consecutive steps of another alternative embodiment of the method. Similar to the embodiment as shown in FIG. 5, FIG. 9 shows that the carrier 1 comprises two layers: a base sheet 9 having a textured upper surface 2 and the release agent coating 10 which is coated on the upper surface 2. On the release agent coating 10 the first and second overlays 11, 12 are applied. In this embodiment the sublimation agent 3 is printed on the second overlay 12 which is located at the side of the upper surface 2 of the base sheet 9.

Figure 10:
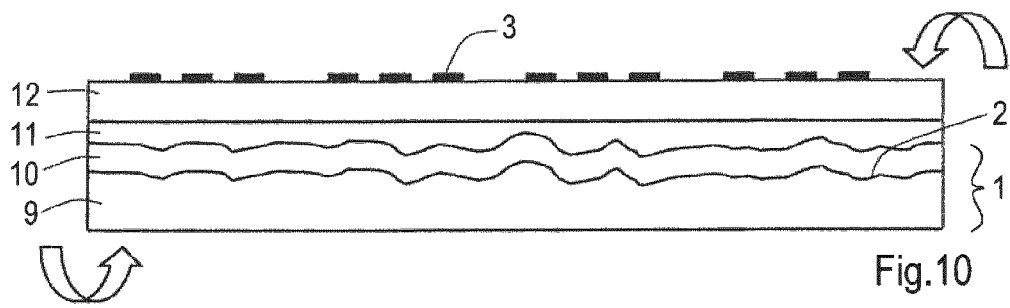
Figure 11:
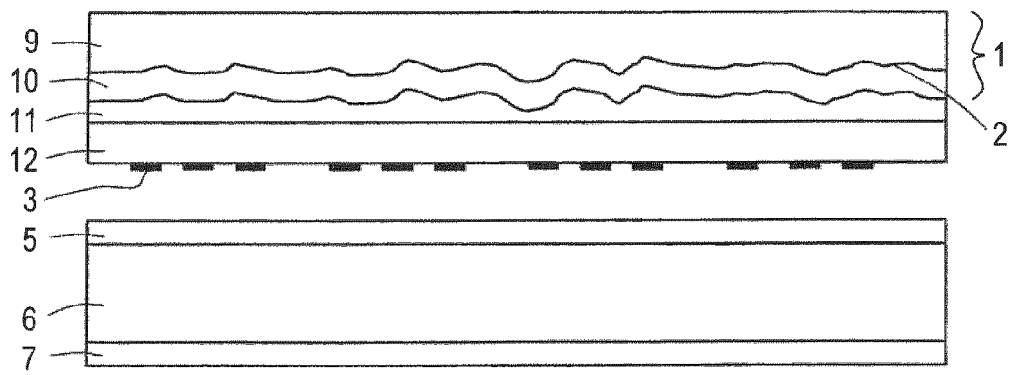
Figure 12:
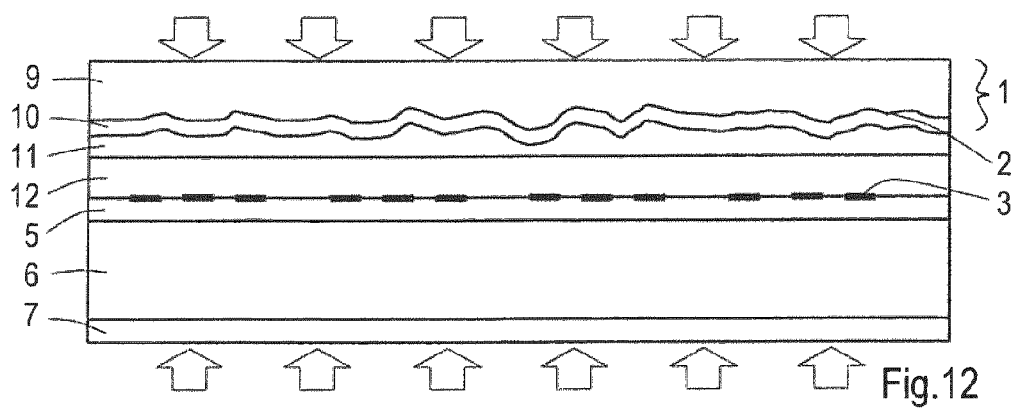
Figure 13:
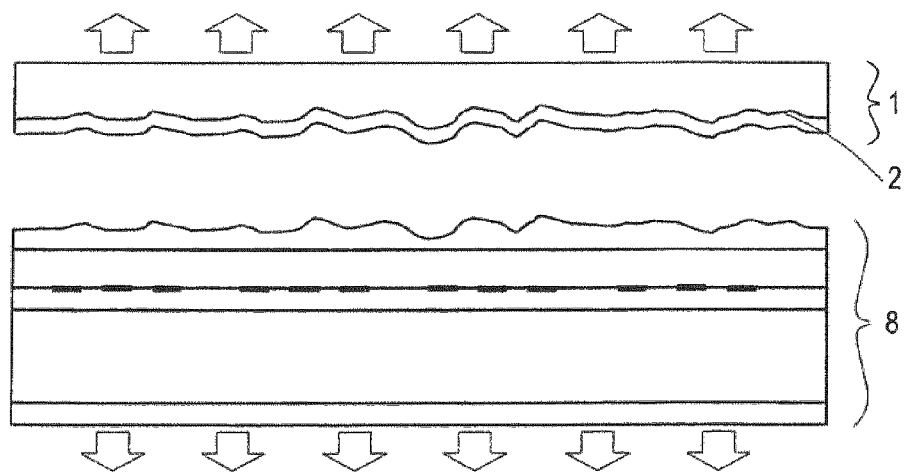

FIGS. 10 and 11 show that the carrier 1 including the first and second overlays 11, 12 and the sublimation agent 3 is turned upside down and placed onto a substrate comprising the base coat 5, the core 6 and the balancing layer 7. In this condition the upper surface 2 of the base sheet 9 as well as the sublimation agent 3 face the layers 5-7. FIG. 12 illustrates a condition in which the layers 5-7 and the carrier 1 including the first and second overlays 11, 12 are pressed together under elevated heat, such that the layers 5-7 are attached to the first and second overlays 11, 12. In this embodiment the vaporized sublimation agent 3 travels directly into the base coat 5. During the step of hot pressing the release agent coating 10 is activated such that the carrier 1 can be removed from the resulting panel 8 easily, which is shown in FIG. 13. The distance of travelling of the sublimation agent 3 is shorter than in case of the embodiment as shown in FIGS. 5-8.

Figure 14:
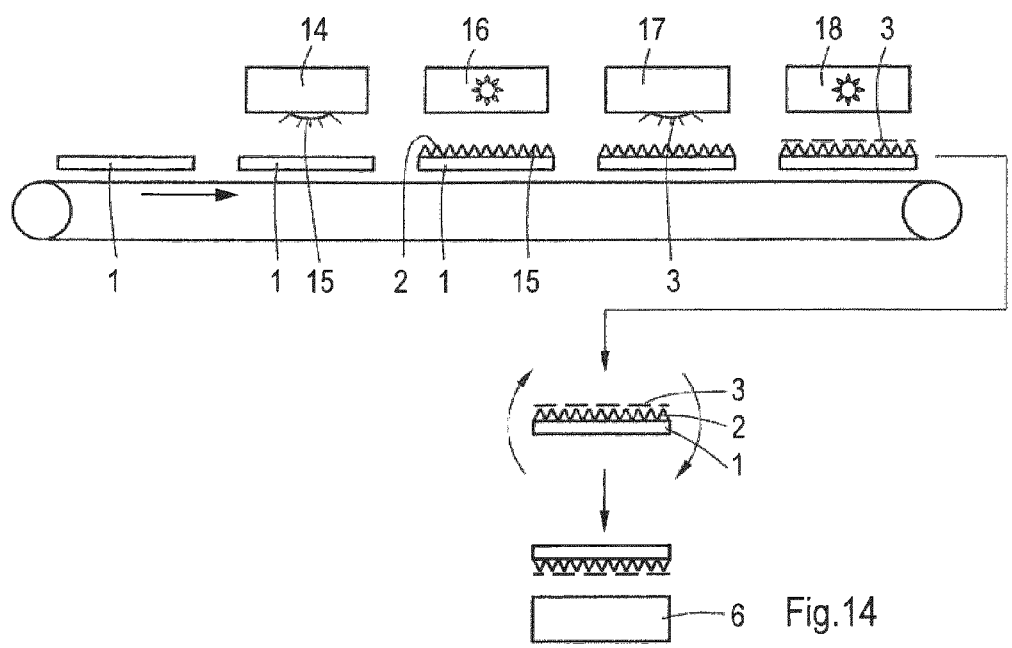
FIG. 14 is an illustrative view of an apparatus for performing the steps of providing the carrier with a textured surface and a sublimation agent.

FIG. 14 shows an apparatus for performing the steps of providing the carrier 1 with a textured surface 2 and a sublimation agent 3. The carrier 1 is supplied in the form of a flexible sheet and transported along an embossment printing module 14 for printing a curable substance 15 onto the carrier 1 and a curing station 16 for curing the curable substance 15 on the carrier 1 such that a hard substance is formed and the carrier 1 obtains a textured upper surface 2. Subsequently, the textured carrier 1 is transported along a sublimation agent printer module 17 for printing the sublimation agent 3 onto the textured upper surface 2 of the carrier 1 and a curing station 18 for drying the sublimation agent 3 on the textured carrier 1. The finished carrier 1 is taken from the apparatus, turned upside down and placed onto the core 6, comparable to the steps as illustrated in FIGS. 1 and 2.

The apparatus as shown in FIG. 14 may be provided with a controller for displacing the carrier 1 along the printing modules 14, 17 and for controlling the printing modules 14, 17 such that there is a predetermined positional relationship between the curable substance 15 and the sublimation agent 3 on the carrier 1. For example, it is possible that the sublimation agent 3 is printed exactly on tops of the cured substance 15 such that the resulting panel 8 obtains the sublimation agent 3 at depressed portions after the steps of pressing and sublimation. During the step of subliming the sublimation agent 3 penetrates into the underlying substrate, for example up to 80 μm, but when the sublimation agent 3 is printed exactly on tops of the cured substance 15, the distance between the upper surface of the resulting panel and the sublimation agent will be still larger. This is advantageous in order to minimize the effect of wear of the resulting panel.

A lot of variations of decoration patterns of the curable substance 15 and the sublimation agent 3 are conceivable, for example a wood pattern, a stone pattern, or the like.

The invention is not limited to the embodiments as shown in the drawings and described hereinbefore, which may be varied in different manners within the scope of the claims. For example, the hard substance on the carrier may be created by printing a pattern of liquid or adhesive on the carrier, scattering hard particles on the carrier which partly stick to the liquid and removing abundant particles outside the printed pattern from the carrier.

The invention claimed is:

1. A method of decorating a substrate, comprising:
   supplying a substrate,
   supplying a carrier, providing the carrier with a textured surface,
applying a sublimation agent on the carrier,
placing the substrate and the carrier including the textured surface and the sublimation agent onto each other,
pressing the substrate and the carrier together and subliming the sublimation agent towards the substrate,
removing the carrier from the substrate,
wherein the textured surface of the carrier is provided by applying a pattern of a hard substance on the carrier, wherein during pressing the substrate and the carrier together, the pattern of the hard substance impresses an upper surface of the substrate, and
wherein the substrate is supplied in the form of a stack of layers, and pressing the substrate and the carrier together and subliming the sublimation agent towards the substrate synchronously laminates the stack of layers.

2. The method according to claim 1, wherein the pattern of the hard substance is applied by printing and curing a curable substance on the carrier.

3. The method according to claim 2, wherein the curable substance is printed by means of a digital printer.

4. The method according to claim 1, wherein the substrate and the carrier are placed onto each other such that the textured surface faces the substrate.

5. The method according to claim 1, wherein the sublimation agent is applied at a side of the carrier which is directed to the substrate.

6. The method according to claim 1, wherein providing the textured surface is performed before applying the sublimation agent.

7. The method according to claim 1, wherein pressing the substrate and the carrier together and subliming the sublimation agent are performed synchronously.

8. The method according to claim 1, wherein before pressing the substrate and the carrier together, at least an additional layer is applied between the substrate and the carrier, wherein the additional layer is fixed to the substrate during the pressing the substrate and the carrier together.

9. The method according to claim 8, wherein the additional layer comprises a resin impregnated sheet, wherein during pressing the substrate and the carrier together heat is supplied to the sheet so as to laminate the sheet to the substrate.

10. The method according to claim 8, wherein at least a resin-containing layer is provided on at least one of the carrier and the substrate before the carrier and the substrate are placed onto each other such that the resin-containing layer is disposed between the carrier and the substrate, wherein the resin is heated above its melting temperature during pressing the substrate and the carrier together.

11. The method according to claim 10, wherein the resin-containing layer is coated as a liquid on the carrier.

12. The method according to claim 1, wherein a release agent coating is provided directly on the textured surface.

13. The method according to claim 1, wherein the carrier comprises a flexible sheet.

14. The method according to claim 1, wherein the sublimation agent is printed on the carrier.

15. The method according to claim 1, wherein the hard substance is a different material than the material of the rest of the carrier.

16. The method according claim 1, wherein the stack of layers comprises a core which is disposed between a resin-impregnated top sheet and a resin-impregnated balancing sheet.

17. The method according to claim 1, wherein the sublimation agent is applied at a side of the carrier which is directed away from the substrate.

* * * * *